(12) United States Patent
Lee

(10) Patent No.: US 6,336,376 B1
(45) Date of Patent: Jan. 8, 2002

(54) BRAKE PEDAL SUPPORTING STRUCTURE OF A VEHICLE

(75) Inventor: Chang-Hyun Lee, Suwon (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 09/419,713

(22) Filed: Oct. 14, 1999

(30) Foreign Application Priority Data

Aug. 10, 1999 (KR) .............................................. 99-32798

(51) Int. Cl.⁷ ................................................. G05G 1/14
(52) U.S. Cl. ............................. 74/512; 74/526; 74/492; 180/274; 180/275; 280/784
(58) Field of Search ........................ 74/512, 513, 516, 74/560, 526, 492; 180/274, 275; 280/784

(56) References Cited

U.S. PATENT DOCUMENTS

| | | | |
|---|---|---|---|
| 4,281,736 A | * 8/1981 | Lizzio | 180/271 |
| 4,319,497 A | * 3/1982 | Shinto et al. | 74/512 |
| 4,421,214 A | * 12/1983 | Sellmeyer | 192/4 A |
| 5,038,907 A | * 8/1991 | Baumann | 74/512 X |
| 5,778,732 A | * 7/1998 | Patzelt et al. | 74/512 |
| 5,848,662 A | * 12/1998 | Sakaue | 180/274 |
| 6,070,488 A | * 6/2000 | Yabusaki et al. | 74/512 |
| 6,176,340 B1 | * 1/2001 | Mizuma et al. | 180/274 |

FOREIGN PATENT DOCUMENTS

| | | | | |
|---|---|---|---|---|
| DE | 40 29 155 A1 | * | 9/1989 | 74/512 |
| DE | 3923852 A1 | * | 1/1991 | 74/512 |
| EP | 0919422 A2 | * | 6/1999 | 74/492 |
| JP | 1-219914 | * | 9/1989 | 74/512 |
| JP | 2-302810 | * | 12/1990 | 74/512 |

* cited by examiner

Primary Examiner—Vinh T. Luong
(74) Attorney, Agent, or Firm—Christie, Parker & Hale, LLP

(57) ABSTRACT

A brake pedal supporting structure designed for a brake pedal of a car having a pedal arm coupled with a mounting bracket attached to a dash panel and a cowl panel to rotate via an actuating rod and a hinge point of a brake booster, wherein pedal arm pushing preventing means is fixed at the rear portion of the pedal arm to face a predetermined interval of the total length of the pedal arm including the hinge point to prevent the pedal arm from being pushed to the rear by the brake booster which will be pushed toward the inside of the car room at the time of a head-on colliding car crash, thereby keeping the pedal arm from being pushed toward the rear of the chassis or enabling the lower portion of the pedal arm to rotate to the front of the chassis to rule out an impact given by the pedal arm onto the driver's lower body and reduce the possibility of the injury at the time of the head-on colliding car crash.

3 Claims, 6 Drawing Sheets

BRAKE PEDAL SUPPORTING STRUCTURE OF A VEHICLE

BACKGROUND OF THE INVENTION

The present invention relates to the brake pedal of a vehicle, and more particularly to a brake pedal supporting structure of the vehicle to prevent a pedal arm of the brake pedal mounted in an inner space inside the car from being pushed toward a driver at the time of a car crash, so as to reduce injury to the driver.

DESCRIPTION OF THE PRIOR ART

In general in front of and around the driver's seat, there are provided a plurality of various operating units necessary for the driver to operate; such as, a steering wheel mounted via a steering axle on the instrument panel for steering the vehicle, a clutch pedal, brake pedal and accelerator pedal, respectively, disposed at the lower part of the vehicle to be selectively used in shifting, braking and increasing speed.

As shown in FIG. 1, the brake pedal 10 is provided with a pedal arm 18 whose upper portion can rotate via a hinge point 18a at a mounting bracket 16 whose front and upper ends are, respectively, fixed onto a dash panel 12 and a cowl panel 14 which separates an inner space in the car and the engine area. A brake booster 20 is connected with an end of an actuating rod 22 coupled with the pedal arm 18 to penetrate through the dash panel 12, and the brake booster 20 is screwed through the coupled part of the dash panel 12 and the mounting bracket 16.

Also, a steering column 24 is assembled on a side of the pedal arm 18 to accommodate a steering axle 23 and is supported by a bracket 28 which is disposed at a steering column supporting member 26 of the chassis.

On the other hand, the upper end of the mounting bracket 16, which rotatively supports the upper portion of the pedal arm 18, is coupled with the bracket 15 attached below the cowl panel 14. The upper end of the mounting bracket 16 can be detachable if it is deformed by being pushed to the inside of the car at the time of a car crash, thereby reducing the impact of the pedal arm 18 hinged at the mounting bracket 16 on the lower part of the driver's body. The detailed description about the structure thus constructed will be omitted because it has already been disclosed.

Even if the upper end of the mounting bracket 16 which rotatively supports the upper portion of the pedal arm 18 is detachable from the cowl panel 14, the brake booster 20 is pushed toward the inside of the vehicle to make the actuating rod 22 push the pedal arm 18 to the rear at the time of a car crash. At this time, even if the upper end of the mounting bracket 16 is detached from the cowl panel 14, the pedal arm 18 is pushed to the rear by the actuating rod 22, thereby inevitably, giving an impact upon the lower part of the driver's body.

SUMMARY OF THE INVENTION

The object of the present invention is presented to solve the above-described problem and to provide a brake pedal supporting structure to prevent the pedal arm from being pushed toward the inner space inside the car at the time of a head-on collision or which can forcibly rotate the pedal arm to the front via the pedal arm pushing preventing means or pedal arm rotating means fixed at the chassis, thereby ruling out any impact given by the pedal arm onto the lower part of the driver's body to reduce the possibility of injury.

In order to accomplish the above-described object of the present invention, there is provided a brake pedal having a pedal arm coupled with a mounting bracket attached to a dash panel and a cowl panel to rotate via an actuating rod and a hinge point of a brake booster, wherein the pedal arm pushing preventing means is fixed at the rear portion of the pedal arm to face a predetermined interval of the total length of the pedal arm including the hinge point to prevent the pedal arm from being pushed to the rear by the brake booster which is pushed toward the inner space inside the car at the time of a head-on collision.

In addition, it is another object of the present invention to provide a pedal arm rotating means disposed at the rear portion of the pedal arm somewhat apart from the hinge point opposite the lower portion of a hinge point to enable the lower portion of the pedal arm to rotate to the front at a center point to contact the lower portion of the hinge point at the time of the car crash.

DETAILED DESCRIPTION OF THE INVENTION

Figure 1:
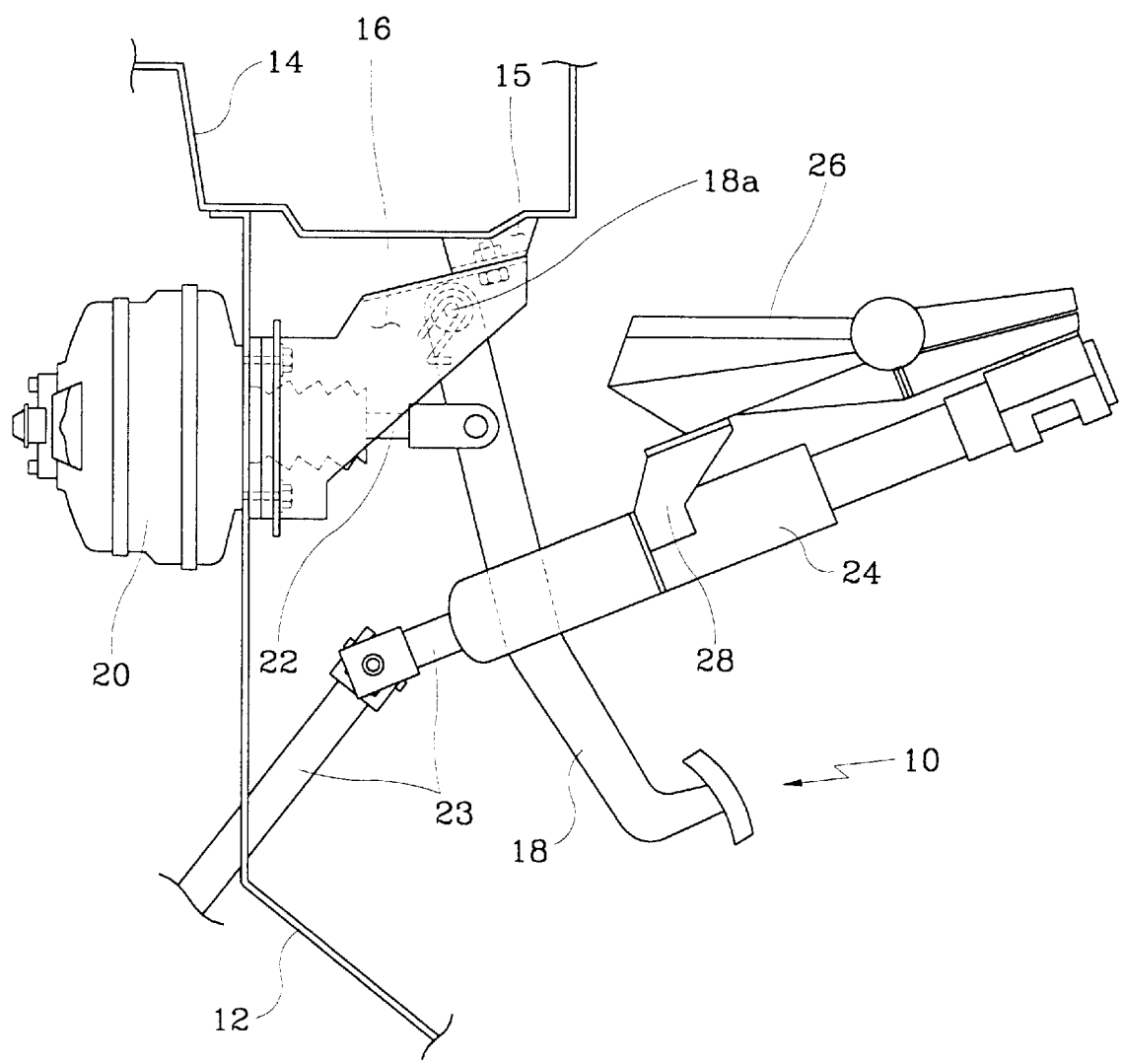
FIG. 1 is a schematic lateral view illustrating a conventional brake pedal mounted in an inner space of a car.
Figure 2:
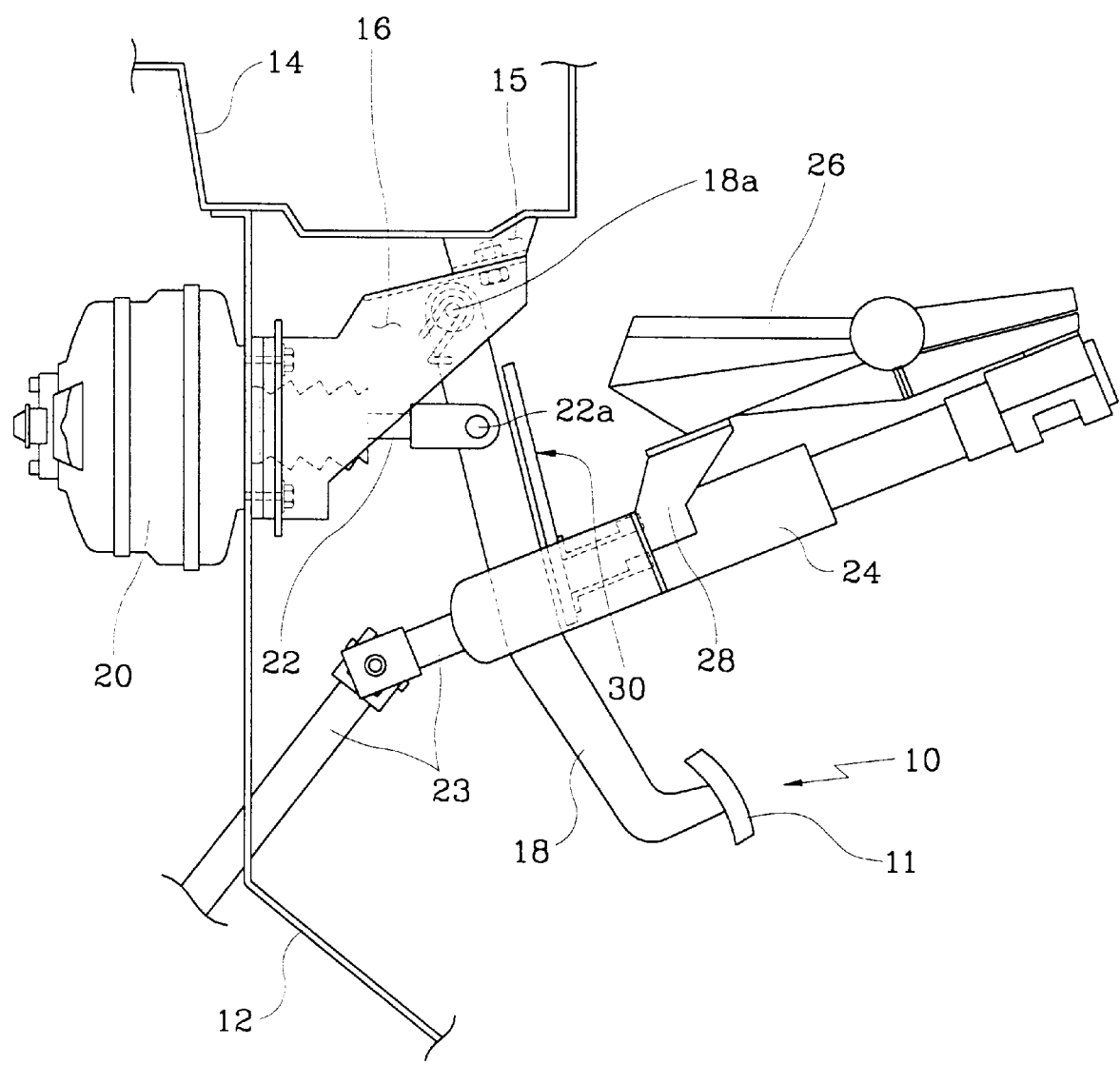
FIG. 2 is a lateral view illustrating a brake pedal being supported by a pedal arm pushing preventing means in accordance with an embodiment of the present invention.
Figure 3:
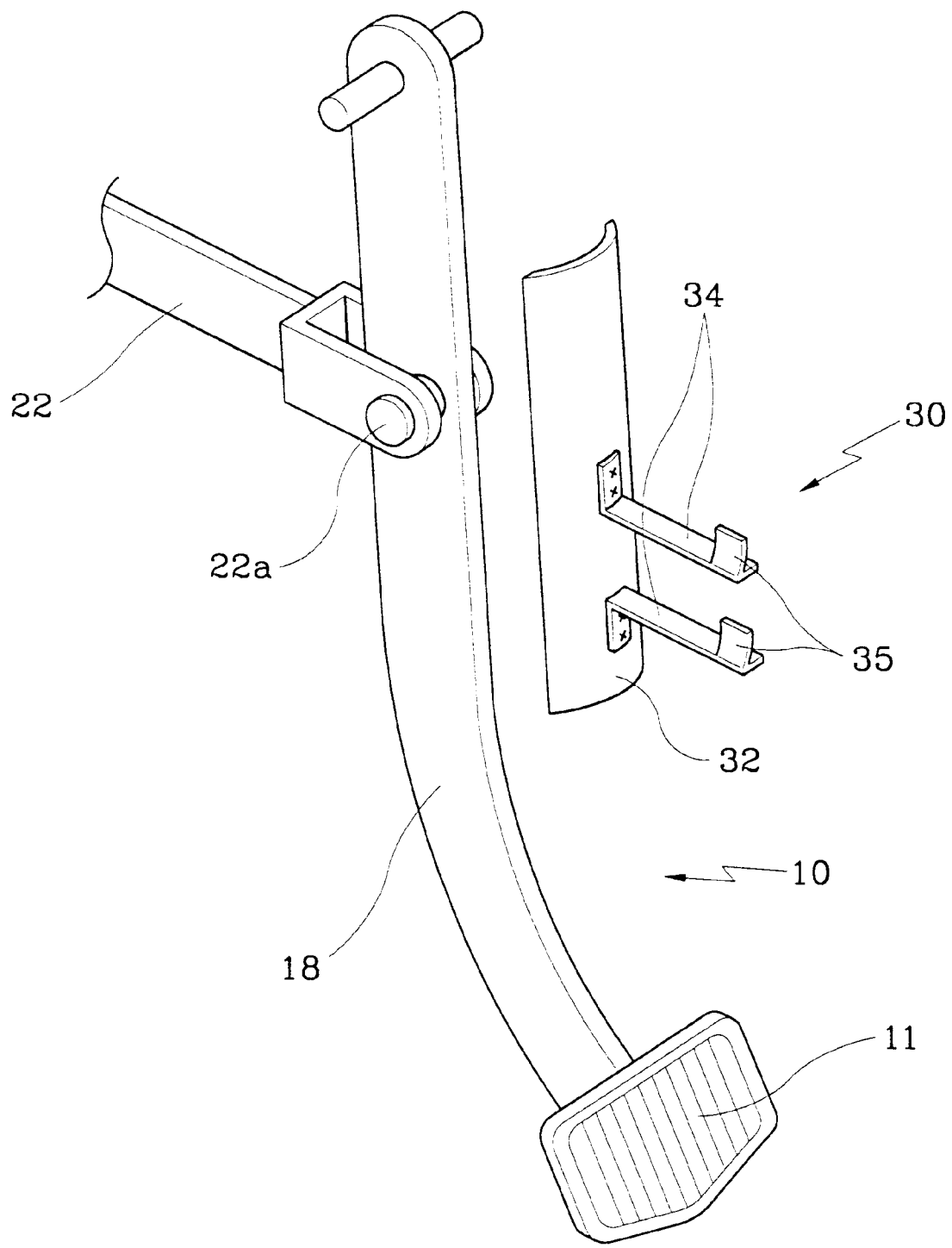
FIG. 3 is an enlarged perspective view illustrating the pedal arm pushing preventing means and the pedal arm of the brake pedal as shown in FIG. 2.

Preferred embodiments of the present invention will be described with reference to accompanying drawings.

As shown in the drawings, a pedal arm 18 which enables a brake pedal 10 to rotate with depressed force generated when a driver puts pressure onto a depressing unit 11 to brake a car, is rotatively disposed at a mounting bracket 16 via a hinge point 18a of an upper end thereof, wherein the upper and front ends of the mounting bracket 16 are, respectively, fixed at a cowl panel 14 and a dash panel 12. An actuating rod 22 of a brake booster 20 is screwed at the dash panel 12 coupled with the pedal arm 18 via a hinge point 22a.

In addition, a steering column 24 is assembled at the side of the pedal arm 18 for steering axle 23 and, at the same time, supported via a bracket 28 fixed at a steering column supporting member 26 of the chassis.

On the other hand, there is provided pushing preventing means 30 of the pedal arm 18, one end is fixed at the steering column 24 and the other end is positioned a little apart from the hinge point 22a of the pedal arm 18. The pedal arm pushing preventing means 30 is assembled with a predetermined vertically extended length at the center of the hinge point 22a of the pedal arm 18, and faces a part of the total length of the pedal arm 18 which covers a hinge point 22a.

In this regard, the pedal arm pushing preventing means 30 includes a pushing resistant unit 32 fixed a little apart and vertically extended along the total length of the pedal arm 18 including the hinge point 22a and a fixing and mounting unit 34 mounted on the back of the pushing resistant unit 32 is firmly fixed at the steering column 24.

At this time, the pushing resistant unit 32 is formed in an inwardly curved shaped to gently accommodate and support the back side of the pedal arm 18 which is pushed to the rear when the chassis is deformed by the impact of the car crash.

The fixing and mounting units 34 are fixed at one side thereof at a predetermined vertical distance there between on the back of the pushing resistant unit 32, while surface attaching units 35 are formed at the other ends of the fixing and mounting units 34 in a curved shape to exactly match and firmly couple with the external curved shape of the steering column 24.

Accordingly, when the brake booster 20 embedded at in the engine area is pushed toward the inner space inside the car by the impact of a head-on collision and causes the actuating rod 22 to push the pedal arm 18, the pedal arm pushing preventing means 30 can stop the pedal arm 18 from being pushed to the rear toward the lower part of the driver's body.

Via the fixing and mounting units 34 which are firmly fixed at one end of the steering column 24, the pushing resistant unit 32 of the pedal arm pushing preventing unit 30 can impose movement resistant force onto a predetermined range of the vertical distance of the pedal arm 18 at the center of the hinge point 22a, thereby restricting the distance to which the pedal arm 18 will be pushed.

As described above, the pedal arm pushing preventing means 30 can effectively resist the pedal arm 18 which is pushed backwards, that is toward the lower part of a driver's body, thereby minimizing the degree of injury.

Figure 4:
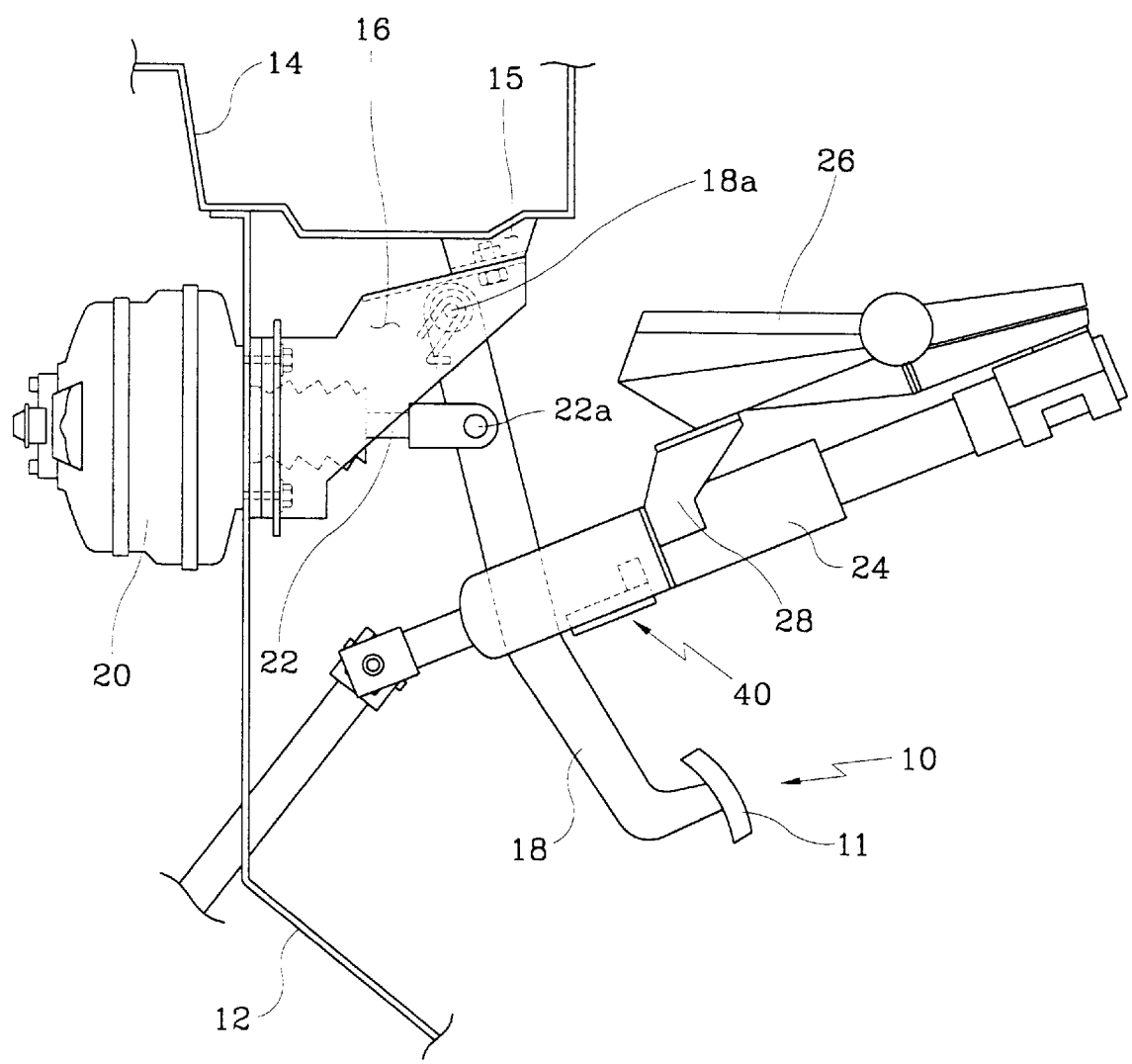
FIG. 4 is a lateral view illustrating a brake pedal being supported by a pedal arm rotating means in accordance with another embodiment of the present invention.
Figure 5:
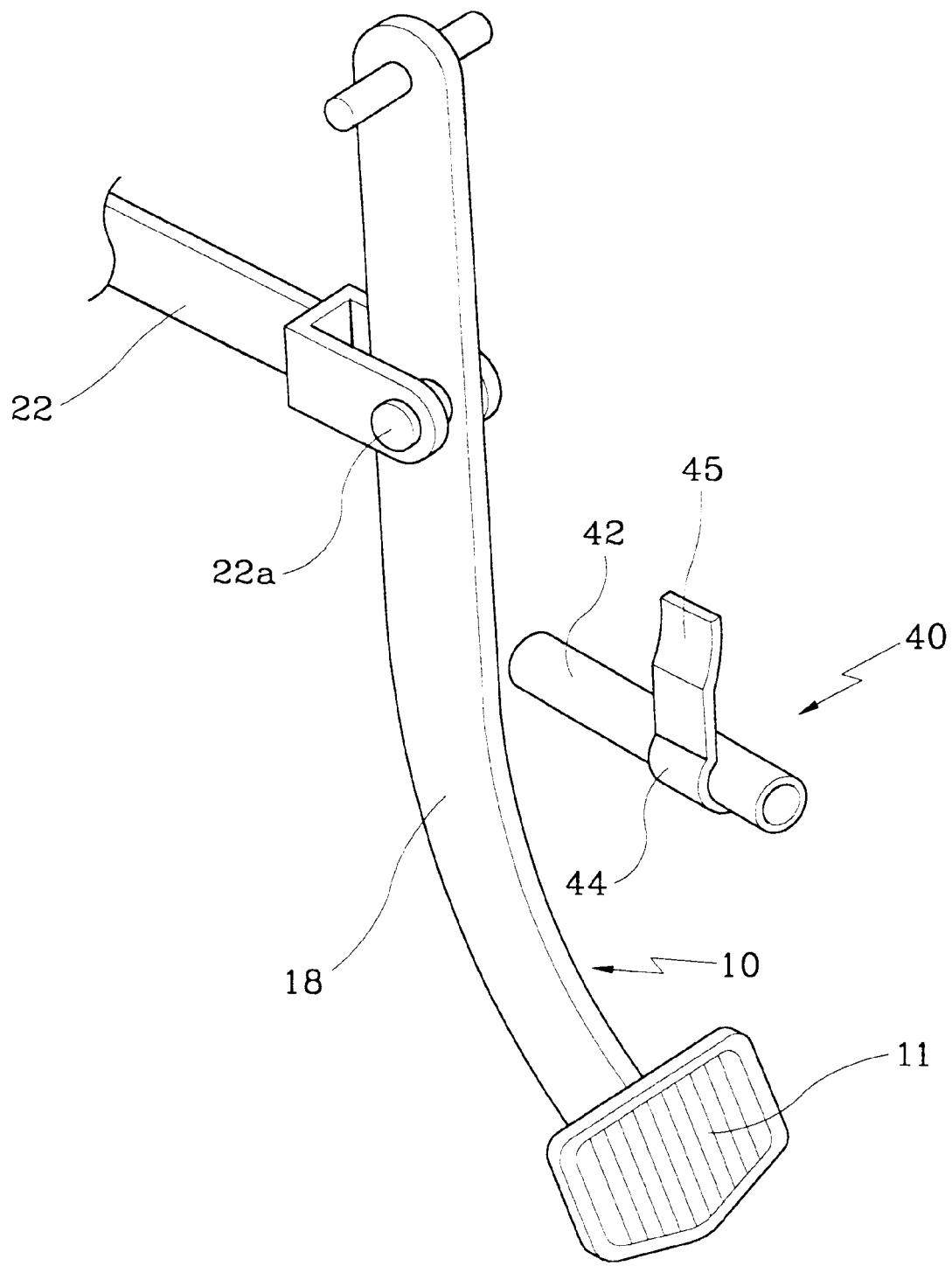
FIG. 5 is an enlarged perspective view illustrating the pedal arm pushing preventing means and the pedal arm of the brake pedal as shown in FIG. 4.
Figure 6:
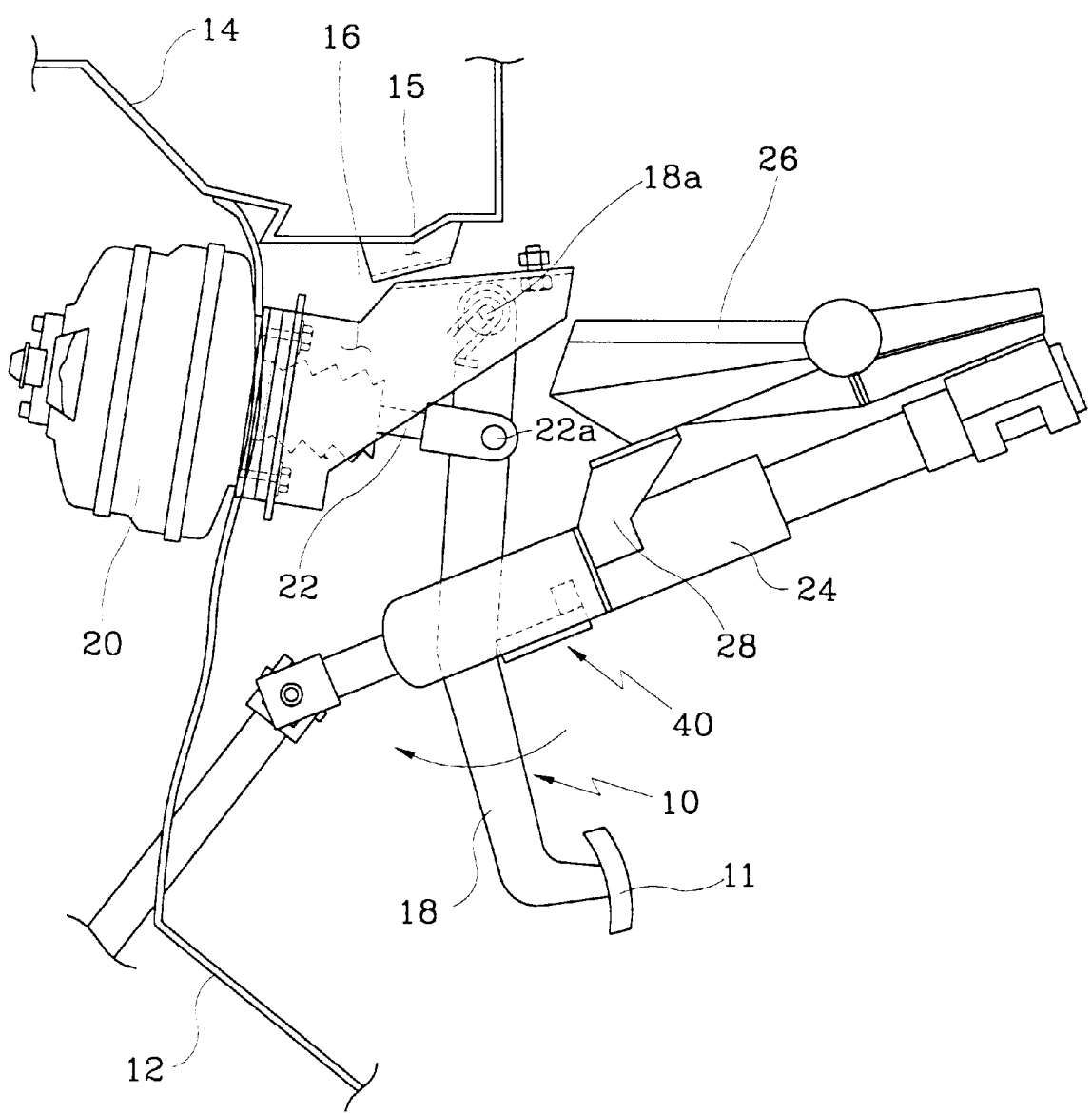
FIG. 6 is a lateral view illustrating a brake pedal being rotated to the front via a pedal arm rotating means.

On the other hand, there is another embodiment of the present invention as shown in FIGS. 4 through 6. Pedal arm rotating means 40 is assembled more or less apart from the lower portion of the pedal arm 18 centering hinge point 22a. The pedal arm rotating means or stop bracket 40 imposes movement resistant force down from hinge point 22a of the pedal arm 18 at the time of a car crash, so that the depressing unit 11 positioned at the lower end of the pedal arm 18 can be forcibly rotated to the front of the chassis.

The lower portion of pedal arm 18 can be rotated to the front centering on a point where the lower portion of the hinge point 22a and the pedal arm rotating means 40 at the time of a car crash.

Therefore, the upper end of the mounting bracket 16, at which the pedal arm 18 is rotatively mounted via the hinge point 18a, is constructed in a structure to be detachable from the bracket 15 attached below the cowl panel 14 at the time of a car crash.

Furthermore, the pedal arm rotating means 40 includes a rotation pressing unit 42 arranged more or less apart to face the lower portion of the hinge point 22a of the pedal arm 18 and a fixing and mounting unit 44 tightly attached at the side of the rotation pressing unit 42 is firmly fixed onto the chassis.

At this time, the rotation pressing unit 42 of the pedal arm rotating means 40 is made of a strong metal to impose movement resistant force onto the lower portion of the hinge point 22a of the pedal arm 18 which will be pushed backwards when the chassis is deformed at the time of a car crash, preferably in a hollowed rod-shape to reduce the weight thereof.

Also, one end of the fixing and mounting unit 44 of the pedal arm rotating means 40 is tightly attached to a rear end of the rotation pressing unit 42, and at the other end thereof is a surface attaching unit 45 integrally equipped in a similarly curved shape to an external curved shape of the steering column 24 to achieve a strong coupling state thereof.

Thus, when the brake booster 20 embedded in the engine gets an impact and is pushed at the time of a head-on, as shown in FIG. 6, the dash panel 12 equipped with the brake booster 20 is deformed and pushed together. At this time, the mounting bracket 16 fixed at the brake booster 20 is also pushed and at the same time is detached from the bracket 15 attached below the cowl panel 14.

Later, the pedal arm 18 mounted at the mounting bracket 16 rotates via the hinge point 18a and is pushed toward the driver. At this time, the rotation pressing unit 42 of the pedal arm rotating means 40 fixed at the steering column 24 contacts the lower portion of the hinge point 22a of the pedal arm 18, and the contacted part is supported to prevent being pushed to the rear.

Accordingly, the upper portion of the pedal arm 18, that is, higher than the point where the rotation pressing unit 42 of the pedal arm rotating means 40 and the pedal arm 18 are contacted, is connected through the actuating rod 22 and the hinge point 22a of the brake booster 20 and is pushed toward the driver. On the other hand, the lower portion of the pedal arm 18, lower than the point where the rotation pressing unit 42 of the pedal arm rotating means 40 and the pedal arm 18 are contacted, is forcibly rotated farther away from the front side of the lower part of the driver's body.

In other words, one end of the pedal arm rotating means 40, which is firmly fixed at the steering column 24, imposes movement resistant force onto the lower portion of the hinge point 22a of the pedal arm 18 and, at the same time, forms a leverage point at the contacting part. Therefore, the lower portion of the hinge point 22a of the pedal arm 18 can rotate toward the front of the chassis at the center of the leverage point of the contacting part.

Accordingly, when the pedal arm rotating means 40 rotates the lower portion of the hinge point 22a of the pedal arm 18, which is pushed far from the lower part of the driver's body at the time of a car crash, to the front side of the chassis, the lower part of the driver's body will be in direct contact with the lower portion of the pedal arm 18 or depressing unit 11, thereby preventing injury.

In addition, the pedal arm pushing preventing means 30 and the pedal arm rotating means 40 of the present invention can, respectively, keep the pedal arm 18 of the brake pedal 10 from being pushed to the rear and enable the lower portion of the hinge point 22a of the pedal arm 18 to rotate to the front side of the chassis at the time of a head-on collision. Besides, they can also have an effect in pressing the actuating rod 22 of the brake booster 20, which will be pushed toward an inner space of the car at the time of a car crash, so that the depressing unit 11 of the brake pedal 10 can have an effective braking function because the same braking effect is exerted onto the actuating rod 22 as the driver depresses the depressing unit 11 of the brake pedal 10 even though it is not actually depressed by the driver.

Furthermore, the pedal arm pushing preventing means 30 and the pedal arm rotating means 40 of the present invention can secure a predetermined size of space between the lower part of the driver's body and the lower portion of the pedal arm 18 after the car crash, thereby making a contribution to providing a safety securing space which may guarantee safety to the lower part of the driver's body at the time of the car crash.

On the other hand, the pedal arm pushing preventing means 30 and the pedal arm rotating means 40, in accordance with the embodiment of the present invention, are described because they are supported by the steering column 24, for example, to impose movement resistant force or rotation generating force onto the pedal arm 18 at the time of a car crash. However, if the pedal arm pushing preventing means 30 and the pedal arm rotating means 40 are effective in imposing adequate movement resistant force onto any related parts of the pedal arm 18, they can be fixed at any part of the chassis.

Therefore, there is an advantage in the brake pedal supporting structure of a car in accordance with the present invention in that the pedal arm pushing preventing means or pedal arm rotating means can keep the pedal arm from being pushed toward the rear of the chassis or enable the lower portion of the pedal arm to rotate to the front of the chassis, thereby reducing the possibility of injury that may be caused when the lower portion of the pedal arm or the depressing unit of the brake pedal directly contacts the lower portion of the driver's body at the time of a head-on collision.

What is claimed is:

1. A brake pedal support structure for an automobile comprising:

a brake pedal mounting bracket, the bracket being removably attachable to a dash panel and a cowl panel;

a brake pedal having a pedal arm pivotably coupled to the pedal mounting bracket, the pedal arm being further coupled to a brake booster via an actuating rod; and a pedal arm stop bracket attached to a steering column and disposed opposite the pedal arm, wherein in the event of a head on collision, the pedal arm contacts the stop bracket wherein the stop bracket forces that portion of the pedal arm located below the stop bracket to rotate away from the driver thereby causing the brake pedal to move away from the driver's lower body.

2. The brake pedal support structure of claim 1, wherein the pedal arm stop bracket is disposed below the steering column to chassis attachment bracket.

3. The brake pedal support structure of claim 1, wherein the pedal arm stop bracket is in the form of a cylindrical tube mounted to the steering column via a mounting bracket.

* * * * *